(12) United States Patent
Walz et al.

(10) Patent No.: US 11,085,476 B2
(45) Date of Patent: Aug. 10, 2021

(54) FITTING FOR RELEASABLY CONNECTING TWO FURNITURE PARTS

(71) Applicant: Häfele Berlin GmbH & Co KG, Berlin (DE)

(72) Inventors: Rüdiger Walz, Neustetten (DE); Peer Leistert, Schöneiche (DE); Gunter Nitschmann, Pfalzgrafenweiler (DE)

(73) Assignee: Häfele Berlin GmbH & Co KG, Berlin (DE)

( * ) Notice: Subject to any disclaimer, the term of this patent is extended or adjusted under 35 U.S.C. 154(b) by 427 days.

(21) Appl. No.: 16/156,455

(22) Filed: Oct. 10, 2018

(65) Prior Publication Data

US 2019/0040892 A1 Feb. 7, 2019

Related U.S. Application Data

(63) Continuation of application No. PCT/EP2017/055271, filed on Mar. 7, 2017.

(30) Foreign Application Priority Data

Apr. 11, 2016 (DE) ...................... 20 2016 101 880.3

(51) Int. Cl.
*F16B 12/26* (2006.01)
(52) U.S. Cl.
CPC .................................. *F16B 12/26* (2013.01)
(58) Field of Classification Search
CPC ............ A47B 2230/12; A47B 2230/14; A47B 2230/16; F16B 21/065; F16B 21/073;
(Continued)

(56) References Cited

U.S. PATENT DOCUMENTS 3,545,712 A * 12/1970 Ellis ........................ F16B 12/26
248/222.11
3,675,955 A * 7/1972 Hajduk ................... F16B 12/26
217/65
(Continued)

FOREIGN PATENT DOCUMENTS

CN 104 379 861 A 2/2015
CN 104 684 440 A 6/2015
(Continued)

*Primary Examiner* — Amber R Anderson
*Assistant Examiner* — Alexus Camero
(74) *Attorney, Agent, or Firm* — Hackler Daghighian Martino & Novak

(57) ABSTRACT

A fitting for releasably connecting two furniture parts includes a first fitting part fastened on a first furniture part and a second fitting part fastened on a second furniture part. The second fitting part has at least one rigid latching cam which is engaged behind by a latching nose being provided on a deflectable latching tongue of the first fitting part. The latching tongue can be moved from its locking position engaged behind the latching cam, into a release position which can be fixed to the second fitting part. The latching tongue has at least one latching spring which can be deflected transversely to the deflecting plane of the latching tongue by a counter bearing of the second fitting part. The free spring end of the latching spring remains deflected by the counter bearing from the locking position until before the release position of the latching tongue is reached.

7 Claims, 4 Drawing Sheets

(58) Field of Classification Search
CPC ...... F16B 21/075; F16B 21/078; F16B 12/26;
F16B 12/38; F16B 5/0614; F16B 12/10;
F16B 12/20; Y10T 403/42; Y10T 403/59;
Y10T 403/591; Y10T 403/60; Y10T
403/7092; Y10T 403/7096; Y10T 403/73
USPC ...... 403/DIG. 4, DIG. 10, DIG. 11, DIG. 13,
403/DIG. 14
See application file for complete search history.

(56) References Cited

U.S. PATENT DOCUMENTS

| | | | | |
|---|---|---|---|---|
| 4,022,352 | A * | 5/1977 | Pehr | B65D 47/0838 222/153.14 |
| 4,127,221 | A * | 11/1978 | Vere | B65D 47/0842 215/214 |
| 4,148,454 | A * | 4/1979 | Carlson | F16B 12/38 108/152 |
| 4,379,648 | A * | 4/1983 | Tanaka | B60K 11/08 403/24 |
| 4,593,441 | A * | 6/1986 | St. Louis | F16B 5/0614 24/295 |
| 4,752,150 | A * | 6/1988 | Salice | F16B 12/26 403/330 |
| 4,813,808 | A * | 3/1989 | Gehrke | F16B 21/16 24/625 |
| 5,013,073 | A * | 5/1991 | Pehr | B65D 43/164 292/87 |
| 5,533,237 | A * | 7/1996 | Higgins | F16B 5/065 24/289 |
| 5,533,240 | A * | 7/1996 | Murai | A44B 11/263 24/615 |
| 5,622,444 | A * | 4/1997 | Gronnevik | B65D 11/1833 403/292 |
| 5,671,513 | A * | 9/1997 | Kawahara | F16B 21/06 24/581.11 |
| 5,931,514 | A * | 8/1999 | Chung | F16B 12/26 292/89 |
| 6,405,413 | B2 * | 6/2002 | Ichimaru | F16B 5/0607 24/297 |
| 6,939,075 | B2 | 9/2005 | Walz | |
| 7,144,181 | B2 * | 12/2006 | Areh | F16B 5/0614 403/109.3 |
| 8,045,337 | B2 * | 10/2011 | Morales | E05C 19/06 361/801 |
| 8,573,881 | B2 * | 11/2013 | Spitz | F16B 2/243 403/397 |
| 8,648,264 | B2 * | 2/2014 | Masumoto | H02G 3/081 174/520 |

FOREIGN PATENT DOCUMENTS

| | | | |
|---|---|---|---|
| EP | 0 681 109 A2 | 11/1995 | |
| EP | 0681109 A2 * | 11/1995 | ............. F16B 12/38 |
| EP | 1156226 A1 * | 11/2001 | ............. F16B 12/26 |
| EP | 1 530 926 A2 | 5/2005 | |
| EP | 1 593 862 A1 | 9/2005 | |
| EP | 1593862 A1 * | 11/2005 | ............. F16B 12/26 |
| GB | 2088013 A * | 6/1982 | ............. F16B 12/26 |
| RU | 2 262 620 C1 | 10/2005 | |
| WO | 98 22721 A1 | 5/1998 | |

* cited by examiner

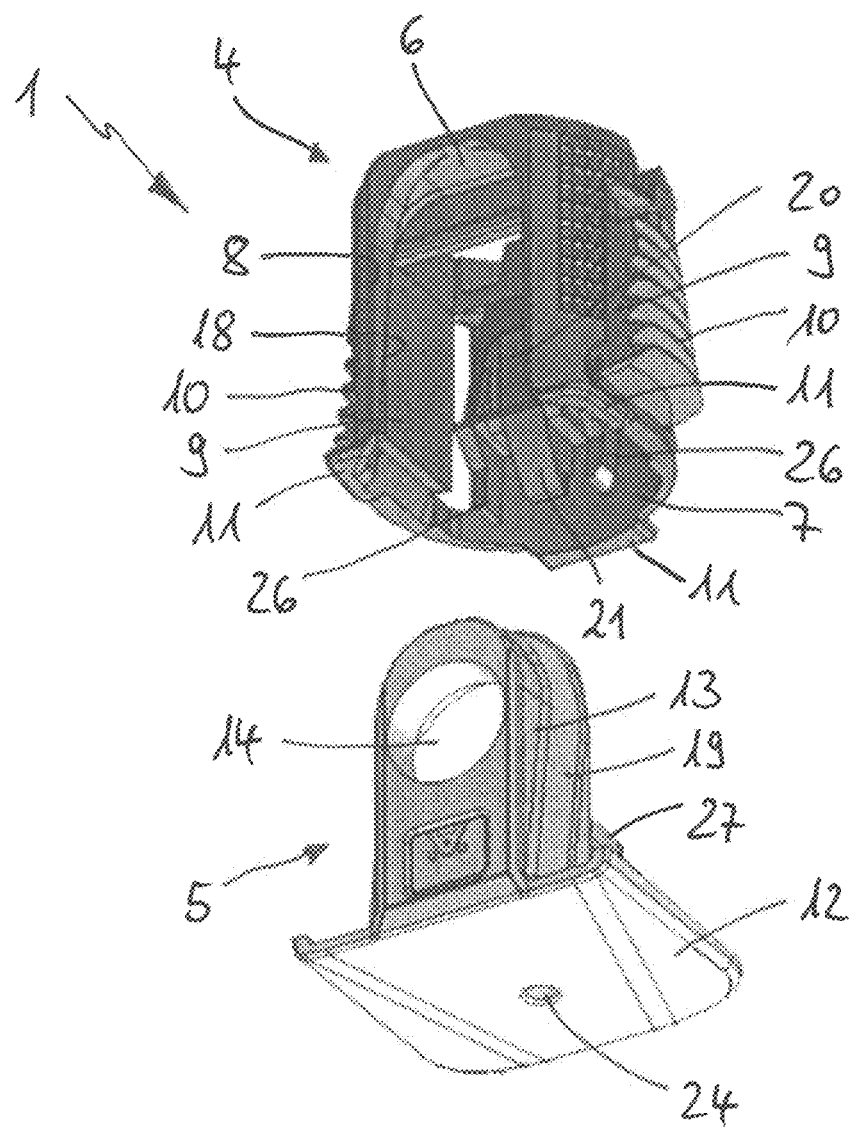
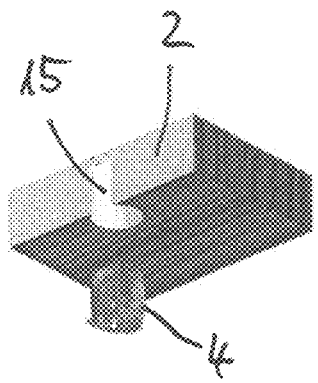
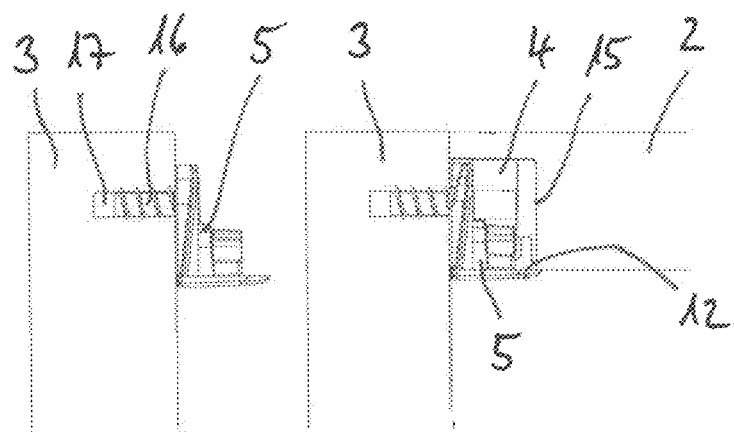
Fig. 1
Fig. 2a   Fig. 2b   Fig. 2c

FITTING FOR RELEASABLY CONNECTING TWO FURNITURE PARTS

CROSS-REFERENCE TO RELATED APPLICATIONS

This continuation application claims priority to PCT/EP2017/055271 filed on Mar. 7, 2017 which has published as WO 2017/178152 A1 and also the German application number 20 2016 101 880.3 filed on Apr. 11, 2016, the entire contents of which are fully incorporated herein with these references.

DESCRIPTION

Field of the Invention

The invention relates to a fitting for releasably connecting two furniture parts, comprising a first fitting part, which can be fastened on a first furniture part, and a second fitting part, which can be fastened on a second furniture part, wherein the second fitting part has at least one rigid latching cam which, when the fitting parts are plugged into each other, is engaged from behind by a latching nose, said latching nose being provided on a deflectable latching tongue of the first fitting part, and wherein the latching tongue can be moved from its locking position, in which it engages behind the latching cam, into a release position, in which it no longer engages behind the latching cam, and can be fixed to the second fitting part in said release position, and this fixing can be released by separating the fitting parts, and also relates to an arrangement comprising two furniture parts which are connected to one another by such a fitting.

Background of the Invention

Such a two-part fitting has become known, for example, from EP 0 681 109 A2, which in FIG. 7 shows a second fitting part with two rigid arresting cams formed on it. In its release position, the resilient latching tongue of the first fitting part can be arrested behind said arresting cam and, when the two fitting parts are being separated, the resilient latching tongue, as soon it is no longer in contact with the arresting cam, will snap back again into its ready-for-connection starting position. Joining the two fitting parts together anew will then once again cause the latching noses of the resilient latching tongue of the first fitting part to engage behind the corresponding arresting cams. Instead of two arresting cams, it is also possible to provide just one, centrally arranged, arresting cam. In this known fitting, the resilient latching tongue has to be elastically deformable to the extent where it can be moved past the arresting cam into its release position.

SUMMARY OF THE INVENTION

In contrast, it is the object of the present invention to specify alternative fixings for the latching tongue in the release position in a fitting of the type mentioned in the introduction.

This object is achieved according to the invention in that the latching tongue, for its part, has at least one latching spring, the free spring end of which, when the fitting parts are being plugged into each other, can be deflected transversely to the deflecting plane of the latching tongue by a counter bearing of the second fitting part, wherein the free spring end remains deflected by the counter bearing from the locking position until before the release position of the latching tongue is reached, and snaps back behind the counter bearing in the release position of the latching tongue, thereby becoming fixed to the second fitting part.

When the two fitting parts are being plugged into each other, according to the invention, at the latest in the locking position of the latching tongue, the at least one latching spring is deflected on the counter bearing transversely to the deflecting plane of the latching tongue and is thus pre-stressed. In the release position of the latching tongue, the latching spring then springs back and engages behind the counter bearing, as a result of which the deflected latching tongue is latched on the carrier part.

Preferably, on either side, the latching tongue has a respective latching spring of this type, the free spring end of which, when the fitting parts are being plugged into each other, can be deflected transversely to the deflecting plane of the latching tongue by an counter bearing of the second fitting part.

The aforementioned object is also achieved according to the invention in that on its rear region, which is facing away from the latching nose, the latching tongue is designed in the form of a latching head which, in the release position of the latching tongue, is pushed through a slot of the second fitting part, said slot being open in the plug-in direction of the second fitting part, until it latches behind the slot wall. This means that the latching tongue remains fixed on the carrier part until the latching head, when the two fitting parts are being separated, has exited from the slot and the latching tongue snaps back again into its ready-for-connection starting position.

For deflecting the latching spring from the locking position into the release position, the latching tongue has to be accessible from the second fitting part. Preferably, the second fitting part has a bearing base with an access opening, through which can be introduced a tool for deflecting the latching tongue. This access opening may be a round hole or a slot opening or cross-slot opening. If, when the fitting parts are have been plugged into each other, the latching tongue extends into the access opening, or even projects therefrom, it is also possible for the latching tongue to be deflected into the release position by someone's finger.

In preferred embodiments of the invention, the first fitting part is designed in the form of a drill-in cup with spreadable cup wings and the second fitting part is designed in the form of a carrier part with a fastening leg, which has a pin formed on it or has a hole for a screw or a pin. When the fitting parts are being plugged into each other, the cup wings are spread open outward by the plugged-in carrier part and are thus anchored in a bore wall.

The invention also relates to an arrangement comprising a first furniture part having an open-periphery bore on the underside, a second furniture part having a bore, and a fitting of the above design, wherein the first fitting part is inserted into the bore of the first furniture part and the second fitting part is inserted into the bore of the second furniture part, and wherein, when they are plugged into each other, the two fitting parts are locked to one another by the latching tongue. Preferably, the two furniture parts are formed from wood or from a wood fiber material.

Further advantages of the invention can be gathered from the description, the claims and the drawing. Similarly, the features mentioned above and those set out below can each be used on their own or together in any desired combination. The embodiments shown and described should not be understood as an exhaustive list, but rather are of an exemplary character for the description of the invention.

BRIEF DESCRIPTION OF THE DRAWINGS

In the drawings:

FIG. 1 shows a first embodiment of the fitting according to the invention with its two fitting parts;

FIGS. 2a-2c show the first fitting part (FIG. 2a), fastened on a first furniture part, the second fitting part (FIG. 2b) fastened on a second furniture part, and the two furniture parts fastened on one another by the two fitting parts (FIG. 2c);

DETAILED DESCRIPTION OF THE PREFERRED EMBODIMENTS

Figure 3A:
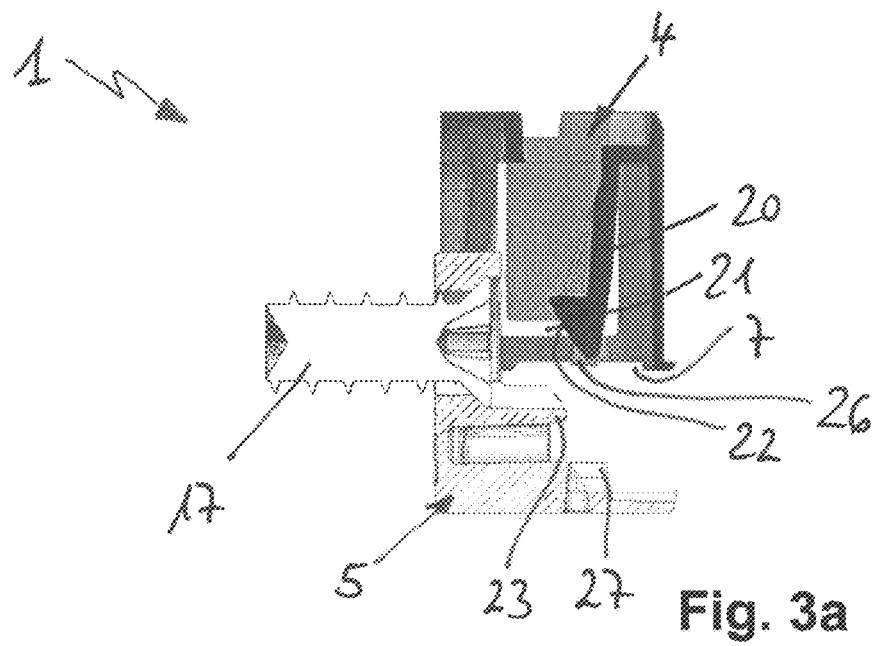
FIGS. 3a-3c show the two fitting parts being plugged into each other, up into a locked end plug position.

In the following description of the figures, identical reference signs are used for components which are the same or functionally the same.

The fitting 1 shown in FIG. 1 serves for releasably connecting two furniture parts 2, 3 (FIG. 2) and comprises a first fitting part 4, which can be fastened on the first furniture part 2, and a second fitting part 5, which can be fastened on the second furniture part 3. In the exemplary embodiment shown, the fitting 1 serves as a shelf connector for fastening a shelf 2 on a carcass wall 3. The shelf 2 and the carcass wall 3 are, for example, wood fiber boards.

The first fitting part is designed in the form of a single-piece drill-in cup 4 with a cup base 6, an end-side cup opening 7 and a longitudinal slot 8, which is provided in the circumferential wall, is open in the direction of the cup opening 7 and extends to the cup base 6. Two cup wings 9 are cut out of the circumferential wall on either side of the longitudinal slot 8, said cup wings being connected to the circumferential wall only on their side which is facing the cup base 6 and being splayed outward beyond the circumferential wall. A rib arrangement in the form of a plurality of circumferential ribs 10 arranged axially one behind the other is formed on the outer side of the cup wings 9. Furthermore, a plurality of radially outwardly projecting peripheral portions 11 are provided for depth-limiting purposes on the cup opening 7. The drill-in cup 4 is made, for example, of plastic.

The second fitting part is designed in the form of a single-piece carrier part 5, which has a bearing base 12 and a fastening leg 13 with a hole 14, said fastening leg projecting upward over the bearing base 12. The carrier part 5 is made, for example, of die-cast zinc.

As shown in FIG. 2a, the drill-in cup 4 is pushed manually, as far as the depth-limiting means permits, into an open-periphery bore 15 on the underside of the shelf 2. The splayed-out cup wings 9 allow the drill-in cup 4 to be retained by itself once it has been pushed in, but a drill-in cup 4 which has been inserted in a twisted state into the bore 15 can still be aligned by hand.

As shown in FIG. 2b, the carrier part 5 is fastened on the carcass wall 3 by means of a screw 16, which engages through the hole 14 and is screwed into a bore 17 of the carcass wall 3. As an alternative to the screw-connection version shown, it is also possible for the carrier part 5 to be fastened on the carcass wall 3 by means of separate pin, which engages through the hole 14 and is plugged into the bore 17, or by means of a pin which is formed on the carrier part 5 instead of the screw hole 14 and is plugged into the bore 17. It is optionally possible for the pin formed on the carrier part to have wedged noses on its upper side.

As shown in FIG. 2c, the shelf 2 has its drill-in cup 4 suspended from above onto the carrier part 5, which is fastened to the carcass wall 3, wherein the drill-in cup 4 has its longitudinal slot 8 plugged onto the fastening leg 13 of the carrier part 5. Oblique guide surfaces 18, 19 on the drill-in cup 4 and on the fastening leg 13 mean that, during the suspending operation, the drill-in cup 4 is drawn in the direction of the carcass wall 3 and the shelf 2 thus butts in a gap-free manner against the carcass wall 3. The plug end position shown in FIG. 2c is reached when the drill-in cup 4 is seated on the bearing base 12. In this plug end position, on the one hand, as will be described in more detail herebelow, the drill-in cup 4 is locked (clipped) on the carrier part 5 counter to its plug-in direction. On the other hand, the two wings 9 of the drill-in cup 4 are spread open outward by the fastening leg 13 and the circumferential ribs 10 are thus pushed into the wall of the bore 15, that is to say into the wood-based material of the shelf 2, and therefore the drill-in cup 4 is firmly anchored in the bore 15.

Figure 3B:
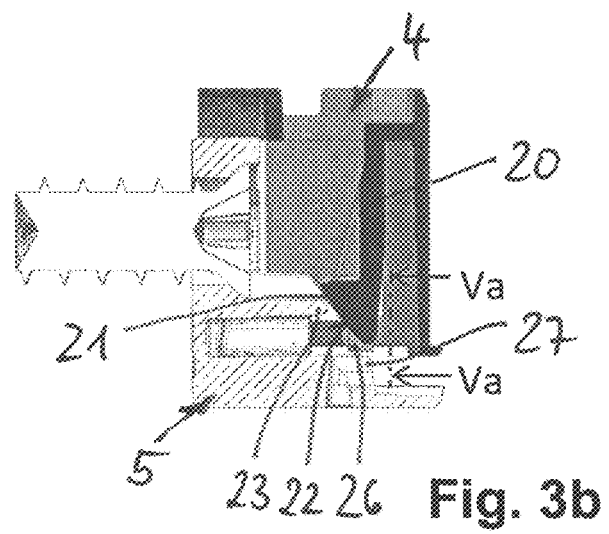
Figure 3C:
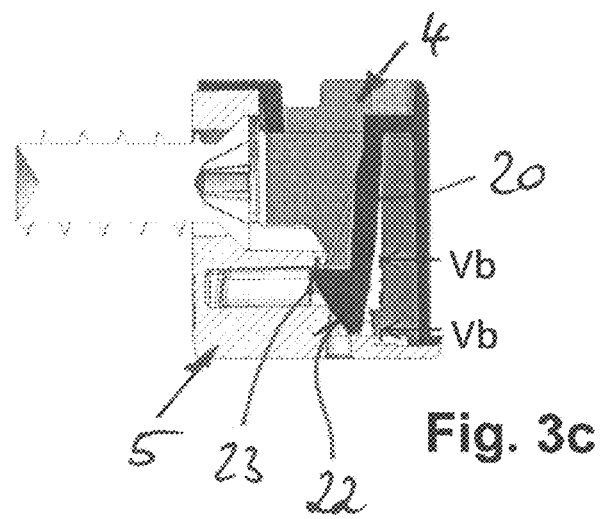

FIGS. 3a-3c show in detail the operation of locking the drill-in cup 4 on the carrier part 5. A deflectable latching tongue 20 is fitted in the drill-in cup 4, said latching tongue having at its free end, which is facing the cup opening 7, a latching nose 21 with a run-on slope 22. A rigid latching cam 23, which interacts with the latching nose 21, is arranged on the carrier part 5. When the drill-in cup 4 and carrier part 5 are being plugged into each other, the latching tongue 20 is deflected from its starting position (FIG. 3a) by the run-on slope 22 of the latching nose 21 on the latching cam 23, and is thus prestressed (FIG. 3b), until, in the plug end position, the latching nose 21 has been pushed past the latching cam 23 and the latching tongue 20 snaps back, by way of its latching nose 21, behind the latching cam 23 (FIG. 3c). The latching tongue 20 engaging behind the latching cam 23 locks the drill-in cup 4, counter to its plug-in direction, on the carrier part 5, and it is therefore no longer possible for the shelf 2 to be released from the carcass wall 3.

Figure 4A:
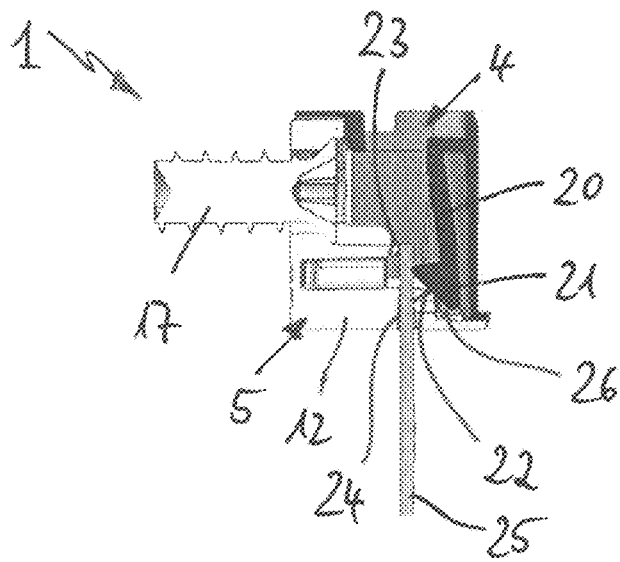
FIGS. 4a-4c show the two fitting parts being unlocked by means of a tool.
Figure 4B:
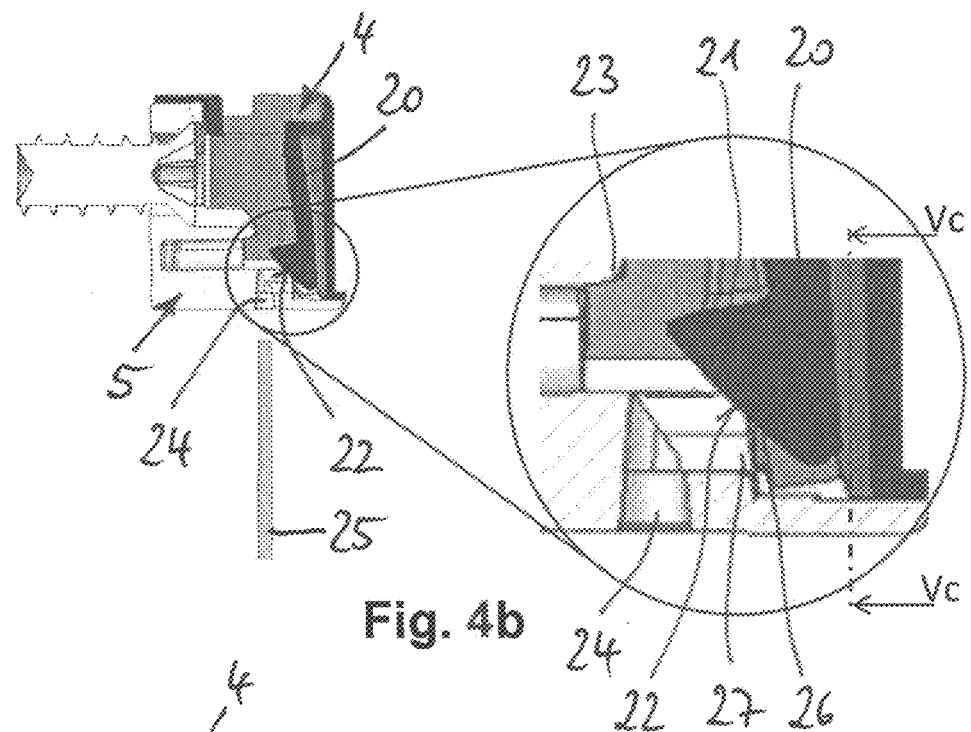
Figure 4C:
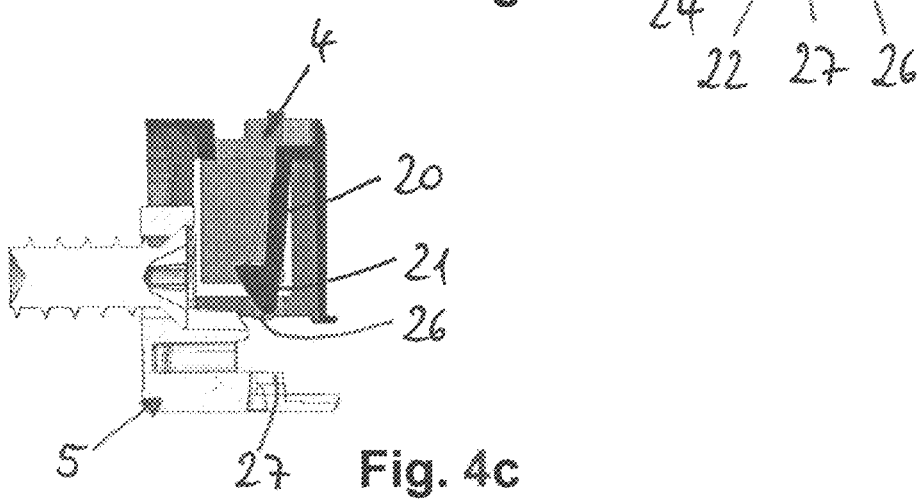

In order to release the locking, use is made of the procedure as shown in FIGS. 4a-4c. A tool in the form of a thin pin 25 (diameter of approximately 1.2 mm) is pushed upward through a small round access opening 24 in the bearing base 12, said pin running against the run-on slope 22 of the latching nose 21 and thus deflecting the latching tongue 20 from the locking position (FIG. 3c) into a release position (FIG. 4a) in which said latching tongue no longer engages behind the latching cam 23. The latching tongue 20 remains fixed in this release position (FIG. 4b) even once the pin 25 has been removed, until, when the two fitting parts 4, 5 are being separated, the latching tongue 20 returns again into its ready-for-connection starting position (FIGS. 3a, 4c).

Figures 5A, 5B, 5C:
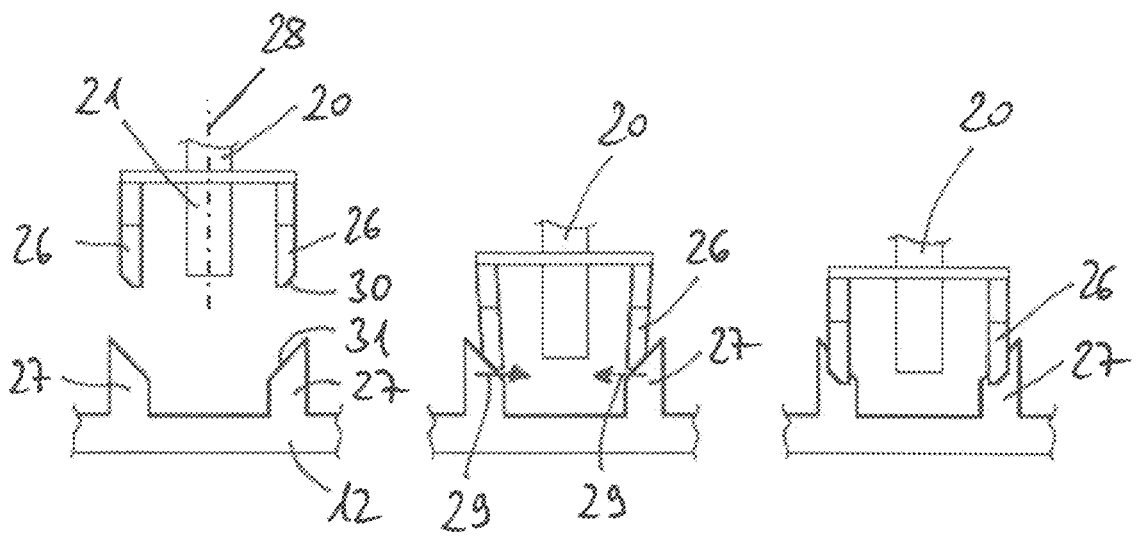
FIGS. 5a-5c show detailed views of the two fitting parts taken along Va-Va in FIG. 3b, Vb-Vb in FIG. 3c and Vc-Vc in FIG. 4b.

For fixing in the release position, the latching tongue 20, as is shown in FIG. 1 and in the detail in FIG. 5a, has a respective latching spring 26 on either side of its latching nose 21 and the carrier part 5 has two counter bearings 27, which project upward over the bearing base 12. When the two fitting parts 4, 5 are being plugged into each other, at the latest in the locking position of the latching tongue 20, the latching springs 26 are deflected on the counter bearings 27, transversally to the deflecting plane 28 of the latching tongue 20, in each case in the direction 29 toward the latching nose 21, that is to say in the direction toward one another, and are thus prestressed in opposite directions (FIG. 5b). The end sides 30, 31 of the latching springs 26 and of the counter bearings 27, said end sides coming into contact with one another when the fitting parts 4, 5 are being plugged into each other, run correspondingly obliquely in relation to the plug-in direction, in order to deflect the latching springs 26 in the direction toward one another. The counter bearings 27 extend from the locking position until before the release position of the latching tongue 20 is reached, and therefore the latching tongues 26 remain deflected, and prestressed, on the counter bearings 27. In the release position of the latching tongue 20, the latching springs 26 then snap back, that is to say in the direction away from one another, and engage behind the counter bearings 27 (FIG. 5c), as a result of which, in the release position, the deflected latching tongue 20 is latched, and prestressed, on the carrier part 5 (FIG. 4b). The latching tongue 20 remains fixed in this release position until, when the two fitting parts 4, 5 are being separated, it is no longer in contact with the counter bearings 27, and snaps back again into its ready-for-connection starting position (FIGS. 3a, 4c).

Instead of the two lateral latching springs 26 shown, it is also possible, as an alternative, for just a single latching spring to be present.

Figures 6, 7:
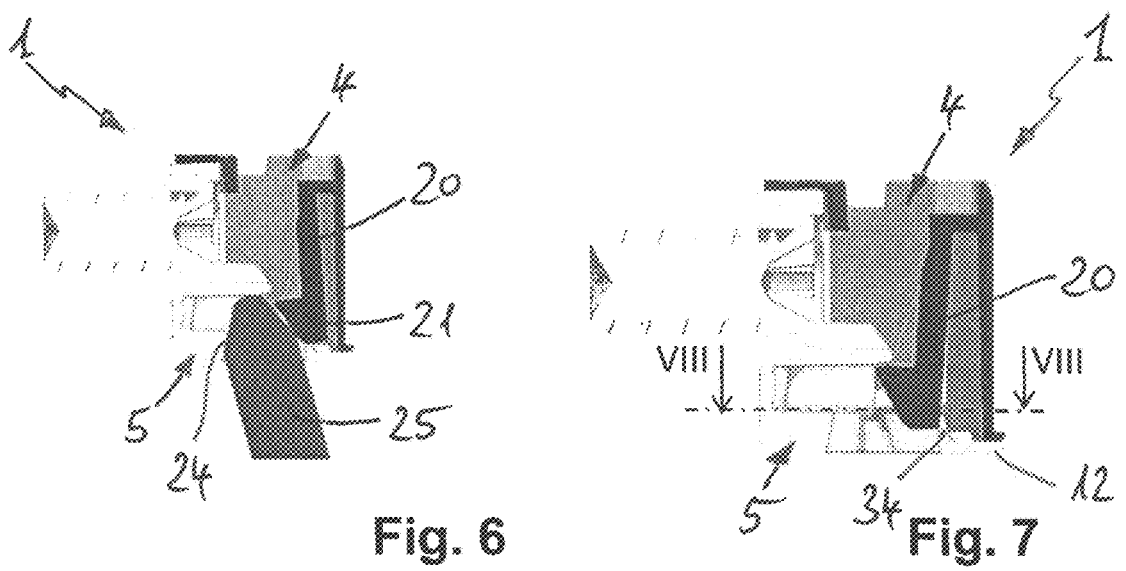
FIG. 6 shows a second embodiment of the fitting according to the invention, in which the two fitting parts are being unlocked by means of a different tool.
FIG. 7 shows a third embodiment of the fitting according to the invention in the locked end plug position.

In contrast to the fitting in FIG. 1, the access opening 24 in the bearing base 12 of the fitting 1 shown in FIG. 6 is designed in the form of a slot opening or cross-slot opening so that, with the aid of the tip of a screw driver 25 plugged into the same, the latching tongue 20 can be deflected from the locking position into the release position shown.

Figures 8A, 8B:
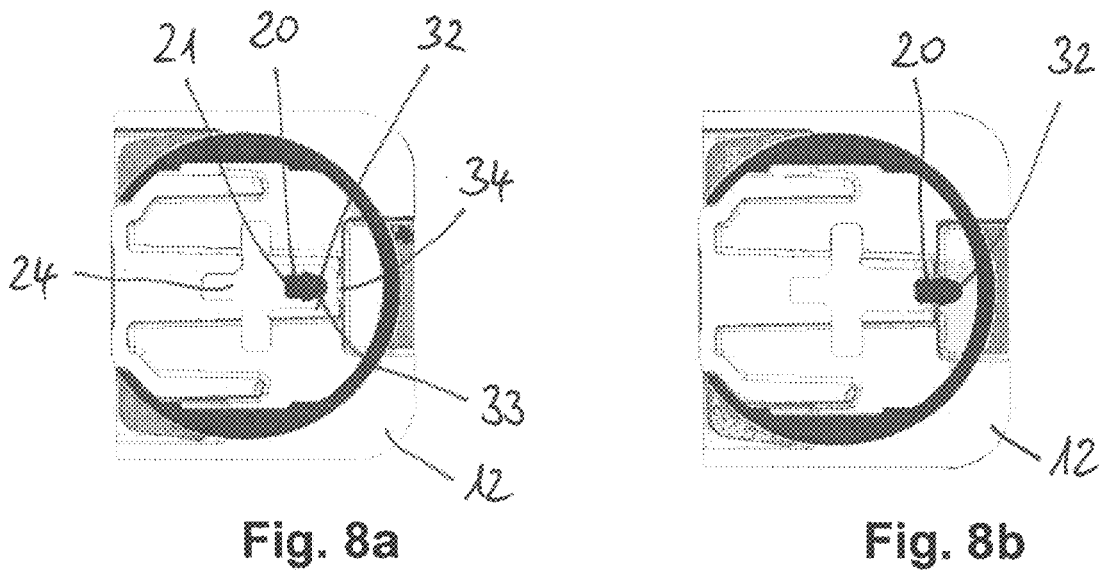
FIGS. 8a and 8b show the operation of unlocking the two fitting parts of the fitting shown in FIG. 7, in a sectional view of said fitting taken along VIII-VIII in FIG. 7.

The fitting 1 shown in FIG. 7 differs from the fitting of FIG. 1 merely by a different means of fixing the latching tongue 20 in the release position. As shown in FIGS. 8a, 8b, the outermost end of the latching tongue 20, is designed in the form of a latching head 32 with two rearwardly tapering outer sides 33 in the rear region which is facing away from the latching nose 21. The carrier part 5 has a slot 34, which is open in the upward direction, in its bearing base 12. Whereas the latching head 32 is spaced apart from the slot 34 in the locking position of the latching tongue 20 which is shown in FIG. 8a, it has been pushed through the slot 34, until it latches behind the slot wall of the carrier part 5, in the release position of the latching tongue 20 which is shown in FIG. 8b, the deflected latching tongue 20 thus being latched, and prestressed, on the carrier part 5. The latching tongue 20 remains fixed in this release position until, when the two fitting parts 4, 5 are being separated, the latching head 32 has exited in the upward direction from the slot 34 and the latching tongue 20 snaps back again into its ready-for-connection starting position.

Instead of being present at the outermost end of the latching tongue 20, as shown, it is possible for the latching head 32 also to be present elsewhere; in particular, it is also possible for the entire rear side of the latching spring 20 to have a rearwardly tapering latching cross section.

In an embodiment which is not shown, the access opening 24 in the bearing base 12 of the carrier part 5 is of such a size that, when the fitting parts 4, 5 are plugged into each other, the latching tongue 20 can be deflected from the locking position into the release position by someone's finger. For this purpose, it is possible for the latching tongue 20 to be extended into the access opening 24 or to project out of the access opening 24.

What is claimed is:

1. A fitting for releasably connecting two furniture parts, comprising:
   a first fitting part, which can be fastened on a first furniture part; and
   a second fitting part, which can be fastened on a second furniture part;
   wherein the second fitting part has at least one rigid latching cam which, when the fitting parts are plugged into each other, is engaged behind by a latching nose, said latching nose being provided on a deflectable latching tongue of the first fitting part; and
   wherein the latching tongue can be moved from its locking position, in which it engages behind the latching cam, into a release position, in which it no longer engages behind the latching cam, and, in said release position, can be fixed to the second fitting part, and this fixing can be disengaged by separating the fitting parts;
   wherein the latching tongue, for its part, has at least one latching spring, a free spring end of which, when the fitting parts are being plugged into each other, can be deflected transversely to a deflecting plane of the latching tongue by a counter bearing of the second fitting part, wherein the free spring end remains deflected by the counter bearing from the locking position until before the release position of the latching tongue is reached, and, in the release position of the latching tongue, snaps back behind the counter bearing and is thus fixed on the second fitting part.

2. The fitting as claimed in claim 1, wherein, on either side, the latching tongue has a respective latching spring, the free spring end of which, when the fitting parts are being plugged into each other, can be deflected transversely to the deflecting plane of the latching tongue by a counter bearing of the second fitting part, wherein the free spring end remains deflected by the counter bearing from the locking position until before the release position of the latching tongue is reached, and, in the release position of the latching tongue, snaps back behind the counter bearing and is thus fixed to the second fitting part.

3. The fitting as claimed in claim 2, wherein the spring free ends of the two latching springs, when the fitting parts are being plugged into each other, can be deflected in the direction toward one another by the counter bearings of the second fitting part.

4. The fitting as claimed in claim 1, wherein at least one of end sides of the free spring end and of the counter bearing, said end sides coming into contact with one another when the fitting parts are being plugged in, preferably both end sides, are designed to deflect the free spring end obliquely in relation to the plug-in direction of the fitting parts.

5. The fitting as claimed in claim 1, wherein the first fitting part is designed in the form of a drill-in cup, in particular with spreadable cup wings.

6. The fitting as claimed in claim 1, wherein the second fitting part is designed in the form of a carrier part with a fastening leg, which has a pin formed on it or has a hole for a screw or a pin.

7. An arrangement comprising a first furniture part, in particular a shelf, having an open-periphery bore on the underside, a second furniture part, in particular a carcass wall, having a bore, and a fitting as claimed in one of the preceding claims, wherein the first fitting part is inserted into the bore of the first furniture part and the second fitting part is inserted into the bore of the second furniture part, and wherein, when they are plugged into each other, the two fitting parts are locked to one another by the latching tongue.

* * * * *